(12) United States Patent
Donley et al.

(10) Patent No.: US 8,719,450 B2
(45) Date of Patent: May 6, 2014

(54) INTERNET PROTOCOL (IP) ADDRESS TRANSLATION

(75) Inventors: Christopher J. Donley, Broomfield, CO (US); Christopher Grundemann, Castle Rock, CO (US); Vikas Sarawat, Broomfield, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 84 days.

(21) Appl. No.: 13/288,334

(22) Filed: Nov. 3, 2011

(65) Prior Publication Data

US 2013/0111065 A1    May 2, 2013

Related U.S. Application Data

(63) Continuation of application No. 13/285,676, filed on Oct. 31, 2011.

(51) Int. Cl.
*G06F 15/16* (2006.01)

(52) U.S. Cl.
USPC .......................... 709/245; 709/228; 709/230

(58) Field of Classification Search
USPC .......................... 709/220, 228, 245, 247, 249
See application file for complete search history.

(56) References Cited

U.S. PATENT DOCUMENTS

| | | | | |
|---|---|---|---|---|
| 5,757,795 | A * | 5/1998 | Schnell | 370/392 |
| 6,339,595 | B1 * | 1/2002 | Rekhter et al. | 370/392 |
| 6,697,873 | B1 * | 2/2004 | Yik et al. | 709/238 |
| 7,085,271 | B2 * | 8/2006 | Gooch | 370/392 |
| 7,242,689 | B2 * | 7/2007 | Ikemura et al. | 370/401 |
| 7,246,235 | B2 * | 7/2007 | Ellison et al. | 713/168 |
| 7,315,543 | B2 * | 1/2008 | Takeuchi et al. | 370/392 |
| 7,367,052 | B1 * | 4/2008 | Desanti | 726/3 |
| 7,373,425 | B2 * | 5/2008 | Barrack et al. | 709/238 |
| 7,450,499 | B2 * | 11/2008 | Park et al. | 370/229 |
| 7,483,488 | B1 | 1/2009 | Hsu et al. | |
| 7,554,981 | B2 * | 6/2009 | Kecskemeti | 370/392 |
| 7,571,299 | B2 * | 8/2009 | Loeb | 711/216 |
| 8,015,315 | B2 * | 9/2011 | Chiang et al. | 709/238 |
| 8,018,873 | B1 * | 9/2011 | Kompella | 370/254 |
| 8,065,515 | B2 * | 11/2011 | Droms et al. | 713/153 |
| 8,184,659 | B2 * | 5/2012 | Hamada | 370/466 |
| 8,432,914 | B2 * | 4/2013 | Zinjuwadia et al. | 370/392 |
| 8,484,666 | B2 * | 7/2013 | Berezansky et al. | 719/328 |
| 8,582,599 | B2 * | 11/2013 | Hamamoto et al. | 370/467 |
| 2004/0052257 | A1 | 3/2004 | Abdo et al. | |
| 2004/0179536 | A1 | 9/2004 | Thubert et al. | |

(Continued)

OTHER PUBLICATIONS

J. Hui; Compression Format for IPv6 Datagrams in 6LoWPan Networks; Jul. 28, 2008; Arch Rock Corporation; Section 1-2.2.*

(Continued)

*Primary Examiner* — John Follansbee
*Assistant Examiner* — Madhu Woolcock
(74) *Attorney, Agent, or Firm* — Great Lakes Intellectual Property, PLLC

(57) ABSTRACT

Translation of Internet Protocol version 4 (IPv4) and Internet Protocol version 6 (IPv6) addresses is contemplated, such as for use in allowing IPv4 devices to connect with IPv6 device without requiring the IPv4 devices to specify the IPv6 address of the connected-to IPv6 device. The IPv6 addresses may be translated to IPv4 addresses suitable for use with the IPv4 devices in a manner that sufficiently compresses the IPv6 for use with the more bit limited nomenclature of an IPv4 address.

20 Claims, 3 Drawing Sheets

(56) References Cited

U.S. PATENT DOCUMENTS

| | | |
|---|---|---|
| 2004/0233916 A1 | 11/2004 | Takeuchi et al. |
| 2004/0258074 A1* | 12/2004 | Williams et al. ............ 370/395.5 |
| 2005/0027778 A1* | 2/2005 | Dimitrelis et al. ............ 709/200 |
| 2005/0083944 A1* | 4/2005 | Liu et al. .................... 370/395.5 |
| 2006/0015647 A1* | 1/2006 | Kang et al. .................... 709/245 |
| 2006/0083262 A1* | 4/2006 | Bhatia et al. .................. 370/466 |
| 2007/0086456 A1 | 4/2007 | Kim et al. |
| 2007/0297402 A1* | 12/2007 | Koehler ........................ 370/389 |
| 2008/0273461 A1* | 11/2008 | Liang et al. ................... 370/235 |
| 2009/0113021 A1* | 4/2009 | Andersson et al. ........... 709/218 |
| 2009/0146833 A1* | 6/2009 | Lee et al. .................. 340/825.52 |
| 2009/0161581 A1* | 6/2009 | Kim .............................. 370/254 |
| 2009/0304026 A1* | 12/2009 | Hamada ........................ 370/466 |
| 2010/0202355 A1* | 8/2010 | Kim et al. ..................... 370/328 |
| 2010/0238922 A1* | 9/2010 | Sundstrom .................... 370/389 |
| 2011/0153827 A1 | 6/2011 | Yengalasetti et al. |
| 2012/0030377 A1* | 2/2012 | Inoue ............................ 709/247 |
| 2012/0173869 A1* | 7/2012 | Stinson et al. ................ 713/153 |
| 2013/0089097 A1* | 4/2013 | Filsfils et al. ................. 370/393 |

OTHER PUBLICATIONS

R. Hinden et al., IP Version 6 Addressing Architecture, Jul. 1998, Nokia/Cisco Systems, RFC 2373, pp. 1-4.*

International Search Report and Written Opinion for Application No. PCT/US12/62731, mailed Jan. 8, 2013, 9 pages.

* cited by examiner

INTERNET PROTOCOL (IP) ADDRESS TRANSLATION

CROSS-REFERENCE TO RELATED APPLICATIONS

This application is a continuation of U.S. application Ser. No. 13/285,676 filed Oct. 31, 2011, the disclosure of which is incorporated in its entirety by reference herein.

TECHNICAL FIELD

The present invention relates to translating Internet Protocol (IP) addresses, such as but not limited to translation of Internet Protocol Version 4 (IPv4) and Internet Protocol Version 6 (IPv6) addresses.

BACKGROUND

Internet Protocol (IP) is a computer network protocol (analogous to written and verbal languages) that all machines on the Internet must know so that they can communicate with one another, i.e., IP is a layer 3 (network layer) protocol in the Open Systems Interconnection (OSI) model. The vast majority of IP devices support IP version 4 (IPv4) defined in RFC-791, the disclosure of which is hereby incorporated by reference in its entirety, and IP version 6 (IPv6) defined in RFC-2460, the disclosure of which is hereby incorporated by reference in its entirety. Devices relying on IP may be assigned an IP address (e.g., an IPv4 and/or an IPv6 address). In some cases, a device configured to support IPv4 may be unable to support IPv6, e.g., the device may be limited to processing messages having IPv4 addresses such that messages having IPv6 addresses are ignored. This can be problematic when it is desirable for the IPv4 dependent devices to interact with IPv6 dependent devices.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
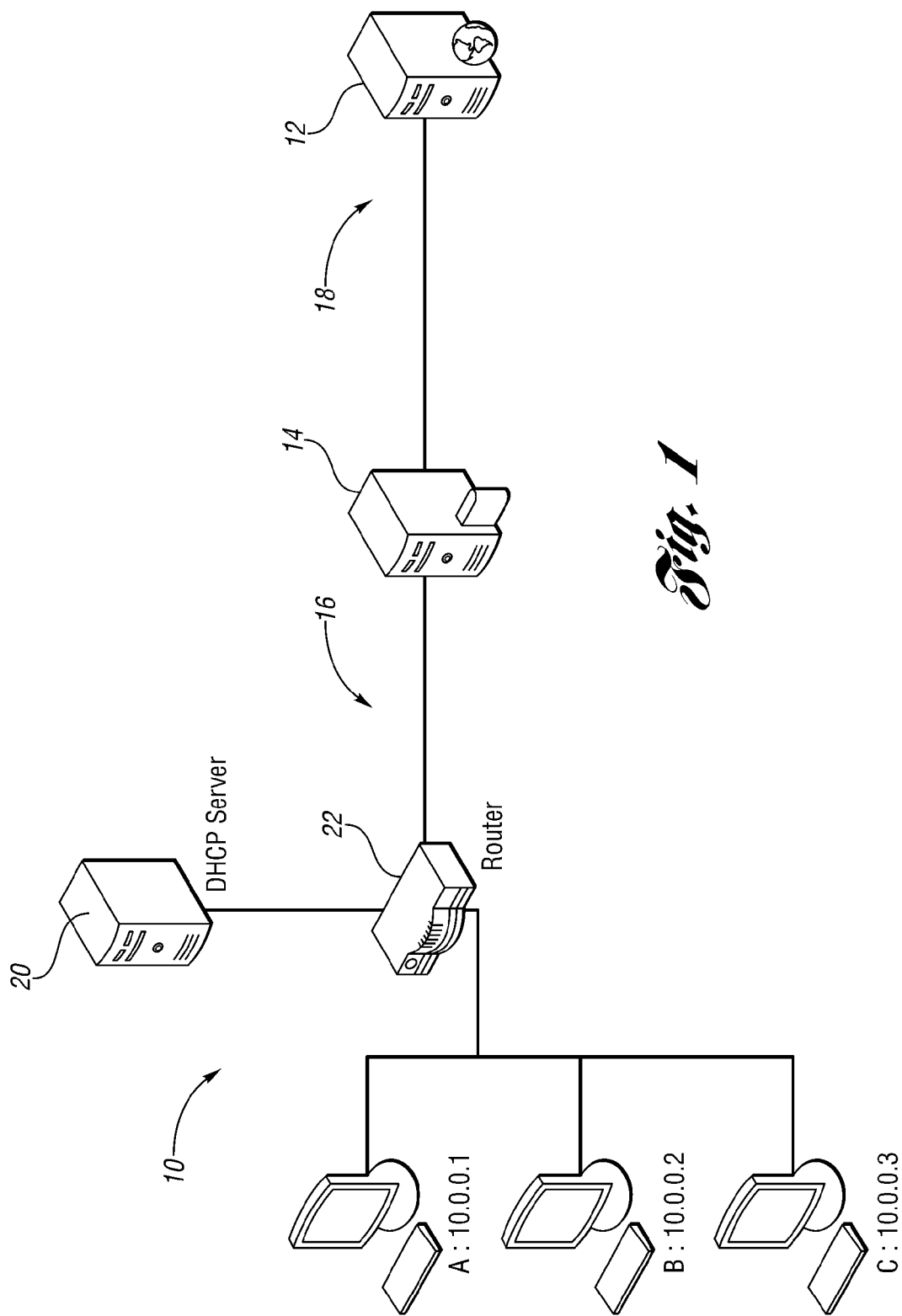
FIG. 1 illustrates a translation system as contemplated by one non-limiting aspect of the present invention.

FIG. 1 illustrates a translation system 10 as contemplated by one non-limiting aspect of the present invention. The system 10 is predominately described with respect to the use of a translator 14 to facilitate connecting Internet Protocol Version 4 (IPv4) devices A, B, C with Internet Protocol Version 6 (IPv6) devices 12. The IPv4 and IPv6 devices A, B, C, 12 are described as one exemplary pair of devices A, B, C, 12 where one of the devices is configured to support an earlier version of a protocol or standard, and therefore is unable to connect with a device supporting a later version of the protocol, at least in a manner sufficient to facilitate message exchanges necessary to establish a session or other communication medium between the devices A, B, C, 12. As noted above, the IPv4 devices A, B, C, 12 may ignore or otherwise disregard messages having IPv6 addresses as the destination address and/or the source address. The translator 14 may be configured to facilitate translating messages between the IPv4 devices A, B, C and IPv6 device 12 in a manner sufficient to permit passage exchange therebetween.

The system 10 is described with respect to supporting Internet Protocol (IP) based connections between a plurality of devices A, B, C and a server 12 or other entity where the translator 14 is a Carrier Grade Network Address Translator (CGN) that facilitates mapping network addressing, such as but not limited to the CGN described in U.S. patent application Ser. No. 13/232,509, the disclosure of which is hereby Incorporated by reference in its entirety. The CGN 14 is described for exemplary non-limiting purposes as one type of Network Address Translator (NAT) operable to facilitate multiplexing a larger pool of network addresses across a smaller pool of network addresses. The present invention, however, fully contemplates its use and application with any system and is not particular limited to a CGN-based system or translators 14 of the type that facilitate multiplexing a larger pool of network addresses across a smaller pool of network addresses, e.g., the translator 14 may be any device configured to translate IP addresses within messages according to the processes contemplated by the present invention.

The translator 14 defines a boundary between an inside network 16 and an outside network 18. A DHCP server 20 may be included to facilitate IP address related operations (shown connected to inside network 16 but it could connected to the outside network 18). The inside network 16 may correspond with a particular geographical location or other area supported by a router 22, e.g., a home network. The outside network 18 may correspond with the Internet or some other network unbound to the inside network 16, e.g., the Internet. While the present invention fully contemplates any combination and number of IPv4 and IPv6 devices being connected to the inside and outside networks, for exemplary purposes, the description herein highlights one scenario where at least one of the devices connected to the inside network is an IPv4-dependent device (i.e., unable to process IPv6 addressed messaging) and at least one the devices connected to the outside network is in IPv6-dependent device (i.e., unable to process IPv4 addressed messaging and/or on assigned to a globally unique IPv4 address, i.e., an IPv4 address cannot be used over the outside network 18 to communicate with the device.). Of course, the present invention fully contemplates the IPv6 device having capabilities to support IPv4 messaging system as well.

The devices A, B, C may be any device capable of supporting IP-based communications and/or connections. The devices A, B, C, for example, may be any type of terminal sufficient for rendering electronic content, such as but not limited to a set-top box (STB), a television, a computer (desktop, laptop, tablet, PDA, etc.), a mobile phone, a media terminal adapter (MTA), a digital video recorder (DVR), etc. The devices A, B, C may include a display or other output through which with the content may be rendered. The devices A, B, C may include a user interface or other feature to facilitate interacting with a user thereof, such as to facilitate selection and use of the content. The devices A, B, C may include a memory, a processor, and other elements necessary to facilitate communications and other operations associated with the present invention. The router 22 or other device may be included to facilitate indications between the devices and the CGN.

The inside and/or outside networks 16, 18 may be any type of electronic medium through which signals may be exchanged between one or more of the devices A, B, C and/or remote device 12. The networks 16, 18 may be any type of wireline or wireless network, or combination thereof, such as but not limited to a cable television network, a cellular network, a Wi-Fi network, an optical network, etc. The content and/or other types of data carried over the networks 16, 18 may be any type of electronic content suitable for electronic transmission, such as but not limited to video, audio, or some combination thereof. The remote device 12 may be a website or a content source associated with a service provider, for example, a cable television service provider, a broadcast television service provider, a satellite television service provider, a multiple system operator (MSO), a streaming video/audio server/service, a home media gateway, or any other entity operable to facilitate transmission of selectable versions of available content. The inability of the IPv4 devices A, B, C to properly message with the IPv6 device 12 can be problematic for MSOs and other service providers where it may be desirable to provide newer services, such as those from an device that requires an IPv6 address, to devices that have been in use for longer periods of time, e.g., an IPv4 device has not been updated and/or cannot be reconfigured to support IPv6.

Figure 2:
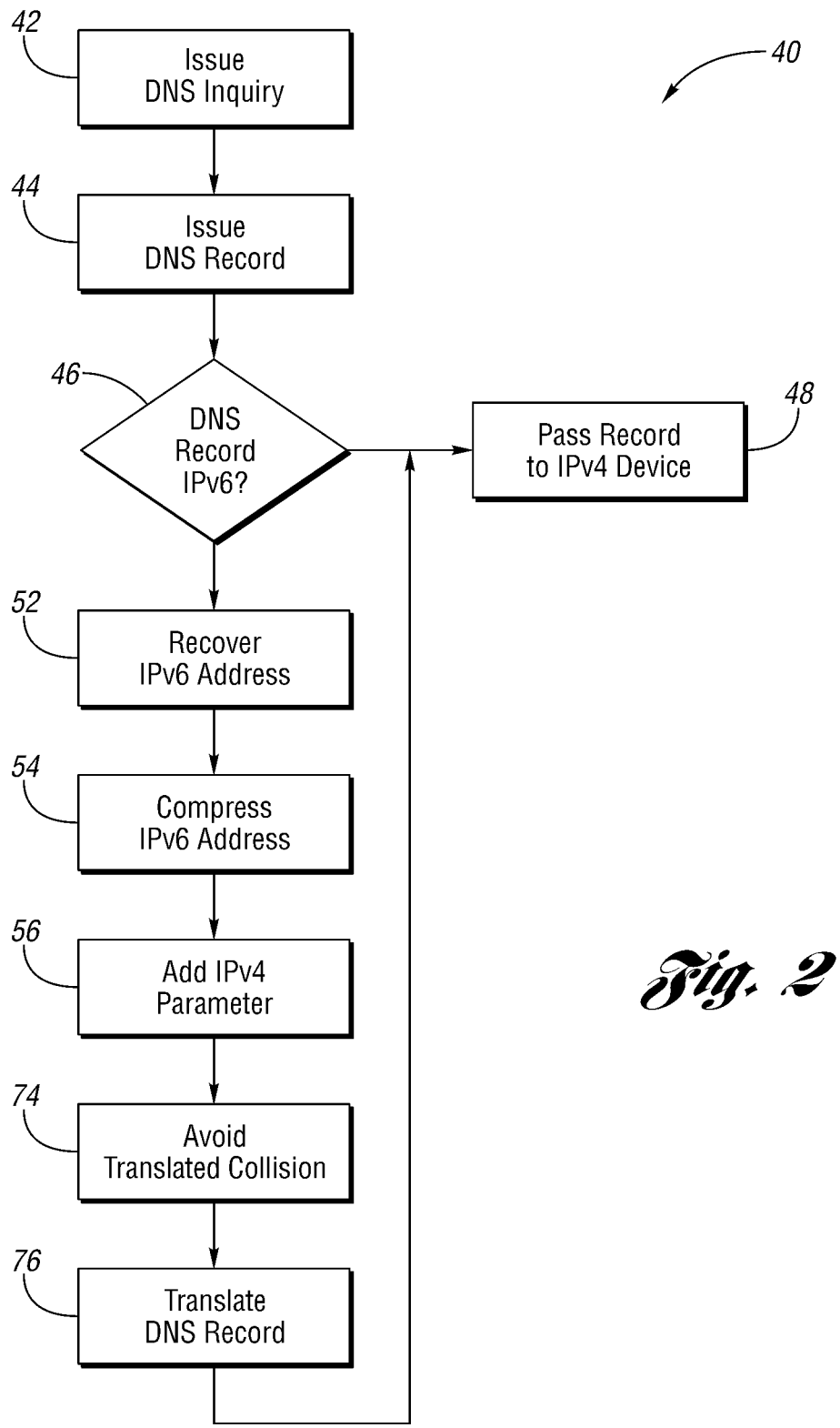
FIG. 2 illustrates a flowchart of a method for translating addresses as contemplated by one non-limiting aspect of the present invention.

FIG. 2 illustrates a flowchart 40 of a method for translating addresses as contemplated by one non-limiting aspect of the present invention. The method may be embodied in a computer-readable medium having instructions stored therein that when operated with a processor or other functioning feature facilitate executing the translation and other operations contemplated by the present invention. The method for exemplary non-limiting purposes is predominately described with respect to translating addresses as part of a Domain Name System (DNS) process where an IPv4 device originates a DNS inquiry in order to connect to a device, such as to connect to a device over the Internet or other network where globally unique IP addresses are relied upon to message with intended recipients. While the present invention is described with respect to a DNS-based process, the present invention is not necessarily limited to DNS and fully contemplates its use and application in any environment and with any messaging process where it may be desirable to translate IP and/or non-IP addresses such as streaming video from an IPv6-only video service provider connecting to a subscriber BluRay player that only supports IPv4.

Block 42 relates to a device, such as but not limited to one of the IPv4-dependent devices A, B, C shown in FIG. 1, issuing a DNS inquiry. The DNS inquiry, for example, may be issued in response to the device attempting to locate a server hosting a particular website of interest. The DNS inquiry, as one having ordinary skill in the art would appreciate, may relate to the device issuing a message to a DNS server or other network element to request a record or information regarding the IP address of the desired server. The IP address may be sufficient to communicate with the desired server over the Internet or some other network. Optionally, in the event the device is connected to an inside network, to a router, or otherwise required to issue the DNS inquiry through an intermediary, the DNS inquiry may be issued from that intermediary and/or processed in some manner by that intermediary prior to being communicated to the DNS server or other locating feature tasked with identifying the IP address of the desired server or device.

Block 44 relates to the DNS server issuing a DNS record. The DNS record may be one of an A-type or an AAAA-type record, depending on whether the desired server is associated with an IPv4 address (A-type record) or an IPv6 address (AAAA-type record). The DNS record may be defined according to RFC 1035, RFC 1123, RFC 2181, and/or RFC 3596, the disclosures of which are hereby incorporated by reference in their entirety. As noted above, the present invention is not necessarily limited to a DNS processes and fully contemplates identifying IP addresses according to other methods and protocols and it is not necessarily required that the address being specified in a record or other message issued in response to an inquiry from a requesting device, e.g., the translation operations contemplated by the present invention may be useful in advance or prior to receiving such requests whereby the translations may be performed on the addresses in anticipation of receiving such a request.

Block 46 relates to assessing whether the DNS record identifies the IP address of the server to be an IPv4 or IPv6 address, i.e. whether the record is an A-type or an AAAA-type record. The assessment may be made by a translator inspecting the DNS record issued by the DNS server, such as by inspecting a "type" field of the resource record. In the event the translator determines the address of the server to be an IPv4 address, the corresponding record may be passed through in Block 48 to the device without being translated. In the event the translator determines address of the server to be an IPv6 address, the IPv6 address may be translated in accordance with the present invention to an IPv4 address. The translation may be sufficient to enable the device to address messaging required to establish a connection with the server according to IPv4, i.e., to facilitate downloading the desired website hosted by the server. The translator may keep track of the translated-from IPv6 address and the translated-to IPv4 address, such as within a mapping table, a relational database, or other storage medium, so that the address can be re-used with future messaging to the same IPv6 device. Optionally, the translated addresses may be deleted or otherwise abandoned after a sufficient period of time, such as after the connection is torn-down and/or the server changes its IP address.

Blocks 52, 54 relates to recovering the IPv6 address specified in the DNS record and thereafter executed and compression operation. The compression operation may be sufficient to represent the IPv6 address with fewer bits than that associated with the IPv6 address, referred to hereinafter as a compressed expression. One non-limiting aspect of the present invention contemplates generating the compressed expression by compressing the IPv6 address with a hashing algorithm or other compression technique such that the compressed expression represents the IPv6 address with less than the 128 bits typically associated with an IPv6 address. A hashing key or other decoding element may be associated with the translated-from IPv6 address, such as by including an entry within the mapping table, so that the full IPv6 address can be recovered from the compressed expression.

Figure 3:
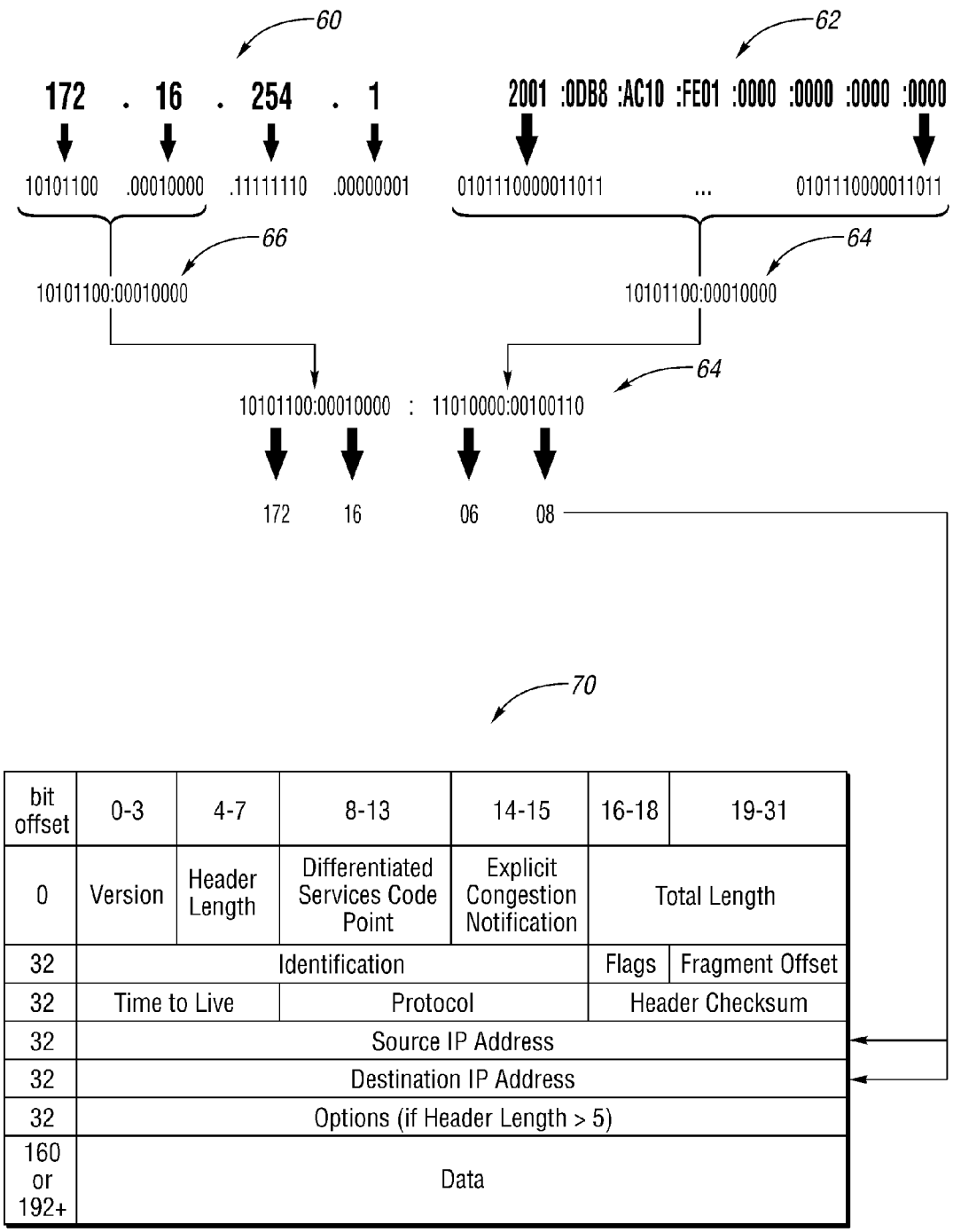
FIG. 3 schematically illustrates address translation as contemplated by one non-limiting aspect of the present invention

Block 56 relates to adding an IPv4 parameter to the compressed expression. The IPv4 parameter may be a prefix or other feature of IPv4 sufficient to identify the combined result has an IPv4 address. FIG. 3 schematically illustrates combining the compressed expression and the IPv4 parameter in a manner contemplated by one non-limiting aspect of the present invention. An IPv4 address 60 is shown next to an IPv6 address 62. The IPv4 address 60 includes three word boundaries between four words represented by numeric values used to designate corresponding binary bits. The IPv4 address 60 includes a total of 32 bits. The IPv6 address 62 includes seven word boundaries between eight words represented by alphanumeric values to designate corresponding binary bits. The IPv6 address includes a total of 128 bits.

One non-limiting aspect of the present invention contemplates compressing the 128 bits of the IPv6 address 62 into 16 bits 64 and combining those 16 bits with the first 16 bits 66 of the IPv4 address 60, i.e. the IPv4 prefix portion of the IPv4 address, such that a translated-to IPv4 address 68 comprises 32 bits. The resulting combination is shown as the translated-to IPv4 address 68. Depending on which direction a message is traveling between the IPv4 device and the IPv6 device (e.g., from the IPv4 device to the IPv6 device or from the IPv6 device to the IPv4 device), the translator may be configured to replace a source IP address and/or a destination IP address included within a header of a corresponding message 70 so that the message can be properly formatted according to the IP version of the intended recipient.

The IPv4 prefix combined with the compressed expression may be selected to be an unused IPv4 prefix, such as one of RFC 5735, the disclosure of which is hereby incorporated by reference in its entirety. For example, in the event the translator is responsible for allocating IPv4 addresses over the inside network 16 and/or otherwise tasked with managing or tracking IPv4 addresses used over the inside network 16, the translator may identify an unused IPv4 prefix. This prefix can then be attached to any number of compressed expressions, i.e., compressed expression for other translated-from IPv6 addresses, such that each of the translated-to IPv4 addresses are unique. Optionally, the translated-to IPv4 addresses may be globally unique (as opposed to only being unique to the inside network 16). This may be done to prevent the translated-to IPv4 addresses from colliding with other IPv4 addresses used by servers or other elements over the Internet to which one of the devices may desire communications. A non-globally unique address could result in the requesting device establishing communications with an undesired IPv6 device.

Of course, the present invention is not necessarily limited to combining the compressed expression with a 16 bit IPv4 prefix or even compressing the IPv6 address. The translator may be configured to execute a reverse DNS query to identify unused IPv4 addresses and/or to perform other operations sufficient to otherwise identify suitable IPv4 addresses. For example, IPv4 addresses themselves and/or prefixes added to the compression expression may be taken from entities for which collision is irrelevant, such as for pirated IPv4 addresses or unauthorized servers to which it may not be problematic to prevent the IPv4 devices from contacting. In the event an IPv4 address is taken from another server or device connected to the Internet, i.e., beyond the inside network, any messages translated through the translator would be unable to reach the device from which the IPv4 address was taken since the IPv4 address would instead be mapped to the IPv6 device. Optionally, rather than combining the compressed expression with IPv4 parameter, the compression expression itself may be used as the translated-to IPv4 device.

Returning to FIG. 2, Block 74 relates to avoiding a translation collision. Unlike the address collisions noted above, the translation collision may relate to avoiding address conflicts resulting from the translation process. Depending on the compression algorithm or hashing technique used to compress the IPv6 address, there may be a possibility that more than one IPv6 address can be compressed to generate the same compression expression. The chances of this occurrence may increase as the compression of the IPv6 address increases, i.e., the chances of a collision may be greater in the event the 128 bits of the IPv6 address are compressed to 16 bits as opposed to the 128 bits being compressed to 32 bits.

One technique contemplated by the present invention to avoid a translation collision may include varying a parameter of the translated-from IPv6 address prior to compressing the address into the compression expression. This may be done in the event the translated-to IPv4 address matches with another IPv4 address included within the same mapping table (in the event multiple translators are used to service different IPv4 devices, it may be acceptable for those translators to use the same translated-to IPv4 addresses since the devices of each would still be able to reach the desired destination). The parameter may be varied by flipping one of the IPv6 values, i.e., changing a bit from "0" to "1", and/or adding one or more stuffing bits, e.g., compressing 129+ bits instead of the 128 bits of the IPv6 address. Optionally, rather than varying a parameter of the IPv6 address, the IPv6 address may be re-hashed/compressed, which may similarly produce a different compression expression in the event the corresponding algorithm is time-varying or includes a variable/rolling algorithm.

Block 76 relates to translating the DNS record prior to being passed to the IPv4 device. The translation may include replacing the IPv6 address specified in the record with the translated-to IPv4 address, replacing other addressing included with the header of corresponding messages, and/or performing some other manipulation sufficient to achieve the translation effect contemplated by the present invention. The translated DNS record is described as one of the many useful applications of the present invention where translation of an IP address may be beneficial (similar translations may be performed according to other protocols). The translating of the DNS record enables the IPv4 device to communicate with the IPv6 device without requiring any manipulation or updates to its processing protocols. The IPv4 device may issue instructions, and address messages, according to IPv4 requirements. The translator may transparently add and remove the IPv4 address mapped to the IPv6 device as messages are exchanged between the IPv4 device and IPv6 device, such as while the IPv4 device is browsing the website hosted by the IPv6 device.

One non-limiting aspect of the present invention relates to a mechanism to connect IPv4 clients in the home or elsewhere with IPv6 servers on the Internet. When a user with an IPv4-only client tries to access an IPv6-only site, the present invention enables a translation device in the customer's router or elsewhere to convert between the two protocols. Because some protocols (e.g. SIP) embed IP address information inside the packet payload, the device may be configured to be application-aware, functioning as a proxy server. This device, however, may experience difficulties in the event the number of contacted servers is relatively large, such as if used to support ISP-wide connectivity, but will suffice for residential or lower volume use where the sum total of contacted servers is relatively small. For example, if subscribers are estimated to generates 33K connections/day, and follow a pareto distribution, where 80% of customers visit the same 20% of sites, the number of IPv6 translations would likely be small enough to be mapped, but when taken at ISP scale, the number of unique IPv6 sites could exceed the 16/32 bits allocated by this invention.

One non-limiting aspect of the present invention contemplates a process where a user device generates a DNS query for the address of a desired server to a home router/proxy server that then sends it over IPv4. The proxy server can execute a recursive lookup for a corresponding domain name. If only a AAAA record (IPv6-only) is returned in response to the DNS query, the proxy server can compress the 128-bit address into a 15-19 bit hash and prepend it with a known prefix (e.g. 198.18.0.0/15, 7.0.0.0/8, or 172.16.0.0/12). The hash can be cached in a translation table and a reply to the user device can be crafted with this hashed address. The user device can then direct service towards the hashed address. The proxy server can intercept traffic, translate the source address into IPv6 (e.g. by prepending ISP-provided/64 prefix), and convert the destination from the hashed IPv4 address back into IPv6. The proxy server can translate IP addresses in the payload using Application Layer Gateway (ALG) functionality. Advantageously, TCP/UDP port information may remain unchanged.

One non-limiting aspect of the present invention contemplates the translator, which may be a NAT46 device, being configured to identify and eliminate inside IPv4 address collisions when hashing outside IPv6 addresses down to 16 bits (or other number of bits). For any NAT46 or similar IPv4-to-IPv6 proxy/translation device to function as contemplated by the present invention, it may need to be able to prepend a 16-bit prefix to a 16-bit hash of the 128-bit IPv6 addresses to create a 32-bit IPv4 addresses for announcement to the local IPv4 host(s). Due to the loss of available data (compressing 128 bits into 16 bits in this example), there may be a chance for collisions, e.g., collisions may be defined as two distinct IPv6 addresses resulting in the same hashed IPv4 address output. In the event of a collision, the IPv4 host would encounter service degradation to those IPv6 endpoints whose hashed IPv4 addresses collide. To mitigate this risk, a form of duplicate hash detection and elimination may be implemented in accordance with the present invention by checking each new hashed IPv4 address against a table of current (previously hashed) IPv4 addresses. If there is a collision, the new address may be re-hashed in such a manner that the collision is eliminated.

While not necessary limited to the following, the present invention contemplates reducing the likelihood of collisions by: a pre-determined bit within the IPv6 address being "flipped" and then the address re-hashed; a deterministic calculation being performed on the IPv6 address and then the address re-hashed (this could be generic bit-stuffing, the insertion of a number unique to the device, or some other mathematical manipulation); a pre-determined bit within the resulting IPv4 address could be "flipped"; a deterministic calculation could be performed on the hashed IPv4 address (this could be a second hashing, or some other mathematical manipulation). Regardless of the specific method for resolving a duplicate hash, the translator may be enabled in accordance with the present invention to record this manipulation in its hash/NAT table in order to deterministically translate the IPv4 address back to its proper IPv6 address when traffic destined for that host passes through the device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A non-transitory computer-readable medium having instructions to facilitate translating an Internet Protocol version 6 (IPv6) address to an Internet Protocol version 4 (IPv4) address, the non-transitory computer-readable medium comprising instructions for:

compressing an entirety of the IPv6 address into a compressed expression using a hashing key associated with a hashing algorithm, the IPv6 address comprising a first number of binary bits and the compressed expression comprising a second number of binary bits, the second number being less than the first number;

selecting an available IPv4 address prefix;

combining the selected IPv4 address prefix to the compressed expression to form the IPv4 address, the IPv4 address being valid for IP-based communications;

wherein the combining of the compressed expression and the selected IPv4 address prefix to form the IPv4 address comprises executing a collision detection process to ensure the IPv4 address does not collide with one of a plurality of assigned IPv4 addresses already stored in a mapping table, wherein the mapping table includes the plurality of assigned IPv4 addresses mapped to a corresponding plurality of assigned IPv6 addresses;

the collision detection process comprising:
  determining the IPv4 address collides with one of the plurality of assigned IPv4 addresses;
  altering at least one parameter of the IPv6 address and recording the altering manipulation in a table; and
  thereafter compressing the altered IPv6 address into a different compressed expression to be combined with the selected IPv4 address prefix to form a new IPv4 address;

storing the new IPv4 address and the IPv6 address within the mapping table, the mapping table being sufficient to identify the IPv6 address from the new IPv4 address;

receiving a message having the new IPv4 address;

translating the new IPv4 address in the message to the IPv6 address by removing the selected IPv4 address prefix from the new IPv4 address and decompressing the remaining portion of the new IPv4 address using the hashing key, the hashing key recovering the altered IPv6 address from the remaining portion for use in determining the IPv6 address using the altering manipulation recorded in the table; and transmitting the message with the IPv6 address in place of the new IPv4 address previously included therein.

2. The non-transitory computer-readable medium of claim 1 further comprising instruction for implementing the hashing algorithm to compress each of 128 binary bits comprising the IPv6 address such that the compressed expression is comprised of 32 binary bits or less, the entirety of the IPv6 address being recoverable from the compressed expression with the hashing key associated with the hashing algorithm.

3. The non-transitory computer-readable medium of claim 2 further comprising instructions for selecting the available IPv4 address prefix to be comprised of 31 binary bits or less.

4. The non-transitory computer-readable medium of claim 3 further comprising instructions for generating the compressed expression to be 16 binary bits and the selected IPv4 address prefix to be 16 binary bits, and adding the 16 binary bits of the compressed expression to the 16 binary bits of the selected IPv4 address prefix such that the IPv4 address comprises 32 binary bits.

5. The non-transitory computer-readable medium of claim 1 further comprising instructions for selecting the available IPv4 address prefix from a plurality of unused IPv4 address prefixes, the unused IPv4 address prefixes being selected by a translator configured to translate the IPv6 address to the IPv4 address.

6. The non-transitory computer-readable medium of claim 5 further comprising instructions for selecting the available IPv4 address prefix when at least one of the plurality of unused IPv4 address prefixes is used in another mapping table of a different translator.

7. The non-transitory computer-readable medium of claim 1 further comprising instructions for selecting the available IPv4 address prefix from a prefix of a randomly selected IPv4 address cleared through a recursive DNS query.

8. The non-transitory computer-readable medium of claim 1 further comprising instructions for altering the at least one parameter of the IPv6 address by flipping at least one value of the IPv6 address.

9. The non-transitory computer-readable medium of claim 1 further comprising instructions for altering the at least one parameter of the IPv6 address by adding at least one stuffing bit to the IPv6 address.

10. The non-transitory computer-readable medium of claim 1 further comprising instructions for combining the compressed expression and the selected IPv4 address prefix to form the IPv4address such that the selected IPv4 address prefix occupies a first and second word portion of the IPv4 address and the compressed expression occupies a third and fourth word portion of the IPv4 address, wherein the first, second, third and fourth word portions being suitable for addressing messages transmitted using IP-based communications.

11. A method executed on a translation device comprising a hardware processor for translating Internet Protocol version 6 (IPv6) and Internet Protocol version 4 (IPv4) addresses to facilitate connecting an IPv4 device with an IPv6 device, the method comprising:

the processor determining a plurality of IPv6 addresses for a plurality of IPv6 devices;

the processor mapping each of the plurality of IPv6 addresses to a corresponding one of a plurality of IPv4 addresses in a mapping table, each of the plurality of IPv4 addresses being uniquely formed by combining a compressed expression of the corresponding one of the plurality of IPv6 addresses with a selected IPv4 address prefix, each compressed expression being an algorithmic reduction of the corresponding one of the plurality of IPv6 addresses generated using a hashing key of a hashing algorithm, and each of the plurality of IPv4 addresses being sufficient to address messages according to Internet Protocol (IP);

wherein forming each of the plurality of IPv4 addresses further comprises the processor executing collision detection to ensure that each of the plurality of IPv4 addresses does not collide with an assigned IPv4 address already stored in the mapping table;

upon determining a first IPv4 address of the plurality of IPv4 addresses collides with an assigned IPv4 address already stored in the mapping table, the processor altering a parameter of a corresponding IPv6 address of the plurality of IPv6 addresses corresponding to the first IPv4 address, recording the altering manipulation in a table and thereafter compressing the altered IPv6 address into a different compressed expression to be combined with the selected IPv4 address prefix to form a new IPv4 address;

storing the new IPv4 address and the corresponding IPv6 address within the mapping table; and upon receiving a request message from the IPv4 device to connect with a first one of the plurality of IPv6 devices, the request message identifying the first one of the plurality of IPv6 devices according to the new IPv4 address, the processor translating the new IPv4 address identified within the request message to the altered IPv6 address by removing the selected IPv4 address prefix from the new IPv4 address and decompressing a remaining portion of the new IPv4 address using the hashing key, the hashing key recovering the altered IPv6 address from the remaining portion for use in determining the corresponding IPv6 address using the altering manipulation recorded in the table, thereafter facilitating communication of the request message to the first one of the plurality of IPv6 devices.

12. The method of claim 11 further comprising determining each compressed expression by compressing the corresponding one of the plurality of IPv6 addresses from 128 bits to 32 or less bits and such that each one of the plurality of IPv6 addresses is recoverable by decompressing the corresponding compressed expression.

13. The method of claim 11 further comprising:
mapping each of the plurality of IPv6 addresses using a first translator; and
assigning the same IPv4 address prefix to at least a plurality of the plurality of IPv4 addresses wherein that same IPv4 address prefix is also used at a second translator, the second translator being independent of the first translator.

14. A non-transitory computer-readable medium having instructions stored therein that when operated with a processor facilitate translating Internet Protocol verstion 6 (IPv6) addresses to Internet Protocol version 4 (IPv4) addresses, the non-transitory computer-readable medium comprising instructions for:

generating a first compressed expression for a first IPv6 address by compressing the first IPv6 address with a hashing algorithm and generating a second compressed expression for a second IPv6 address by compressing the second IPv6 address with the hashing algorithm, the first compressed expression representing the first IPv6 address with fewer machine-readable bits than the first IPv6 address and the second compressed expression representing the second IPv6 address with fewer machine-readable bits than the second IPv6 address; and combining the first compressed expression with a first IPv4 address prefix to form a first IPv4 address, the first IPv4 address being sufficient for addressing message headers according to Internet protocol (IP), and storing the first IPv4 address and the first IPv6 address within a mapping table, wherein the mapping table includes a plurality of assigned IPv4 addresses mapped to a corresponding plurality of assigned IPv6 addresses;

combining the second compressed expression with the first IPv4 address prefix to form a second IPv4 address, the second IPv4 addresses being sufficient for addressing message headers according to Internet protocol (IP);

executing a collision detection process to ensure the second IPv4 address does not collide with the first IPv4 address in the mapping table and upon detecting the first IPv4 address matches the second IPv4 address, generating a third IPv4 address by:

i. manipulating a parameter of the second IPv6 address to generate a third IPv6 address and recording the manipulation in a table; and ii. compressing the third IPv6 address with the hashing algorithm to generate a third compressed expression;

iii. forming the third IPv4 address by combining the third compressed expression with the IPv4 address prefix;

receiving a message having the third IPv4 address;
translating the third IPv4 address to the second IPv6 address by removing the first IPv4 address prefix from the third IPv4 address and decompressing a remaining portion of the third IPv4 address using a hashing key associated with the hashing algorithm, the hashing key recovering the third IPv6 address from the remaining portion for use in determining the second IPv6 address using the manipulation recorded in the table; and transmitting the message with the second IPv6 address in place of the third IPv4 address.

15. The non-transitory computer-readable medium of claim 1 further comprising instructions for identifying the IPv6 address from within a header of the message, the header being used to facilitate addressing a payload of the message, and subsequently using the new IPv4 address to address the payload for further transport.

16. The non-transitory computer-readable medium of claim 1 further comprising instructions for compressing the IPv6 address without loss of data such that the entirety of the IPv6 address is subsequently recoverable with decompression of the compressed expression, including compressing the IPv6 address with the hashing key to generate the compressed expression and thereafter decompressing the compressed expression with the hashing key to generate the IPv6 address.

17. The non-transitory computer-readable medium of claim 16 further comprising instructions for selecting the hashing key to be at least one of time-varying and based on a rolling variable.

18. The method of claim 11 further comprising each of the plurality of IPv6 addresses comprising a first number of binary bits and each compressed expression comprising a second number of binary bits, the second number being less than the first number.

19. The non-transitory computer-readable medium of claim 14 further comprising instructions for varying the parameter by flipping at least one bit of the second IPv6 address.

20. The non-transitory computer-readable medium of claim 14 further comprising transitory instructions for varying the parameter by adding at least one stuffing bit to the second IPv6 address.

* * * * *